July 16, 1957
C. M. ANDREWS
2,799,240
FLAG MOUNTINGS
Filed Dec. 30, 1954
2 Sheets-Sheet 1
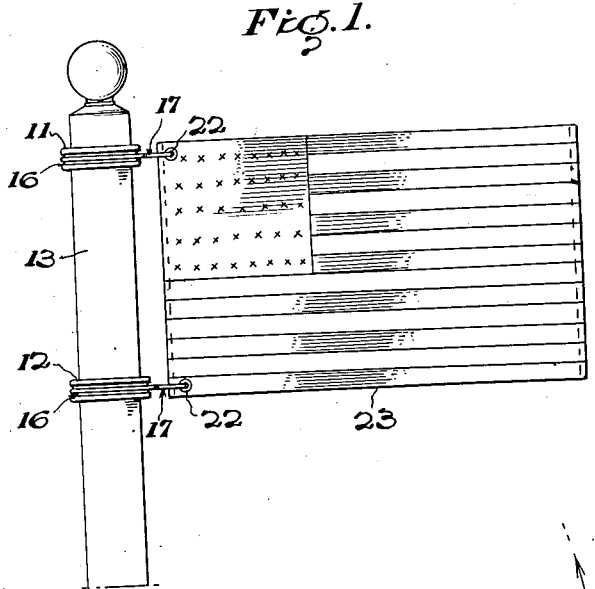
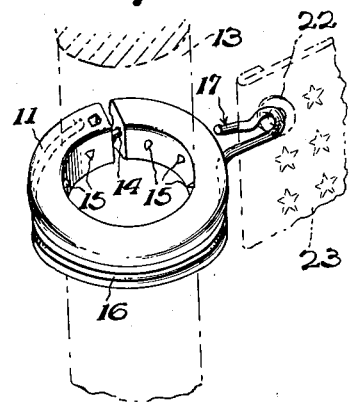
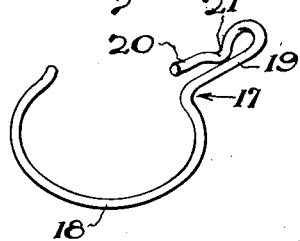
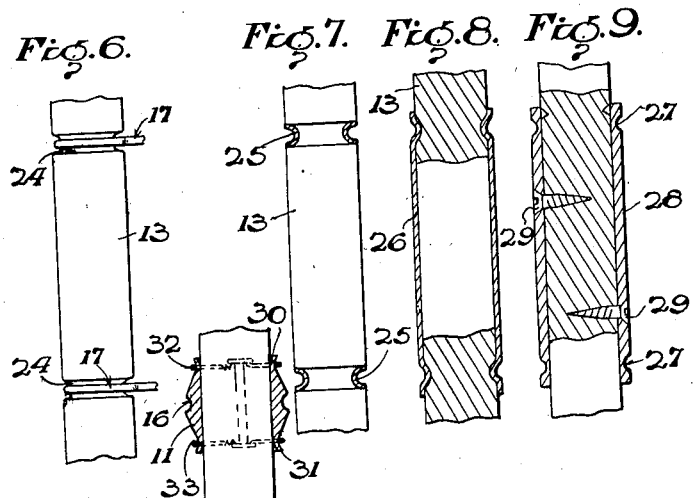
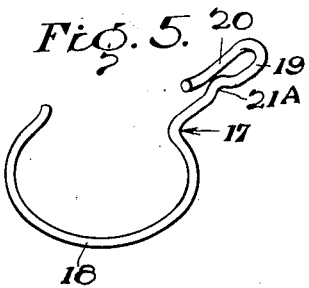
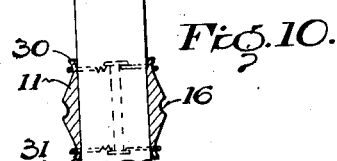
INVENTOR
Cora M. Andrews,
BY Albert J. Kramer
ATTORNEY July 16, 1957
C. M. ANDREWS
FLAG MOUNTINGS
2,799,240
Filed Dec. 30, 1954
2 Sheets-Sheet 2
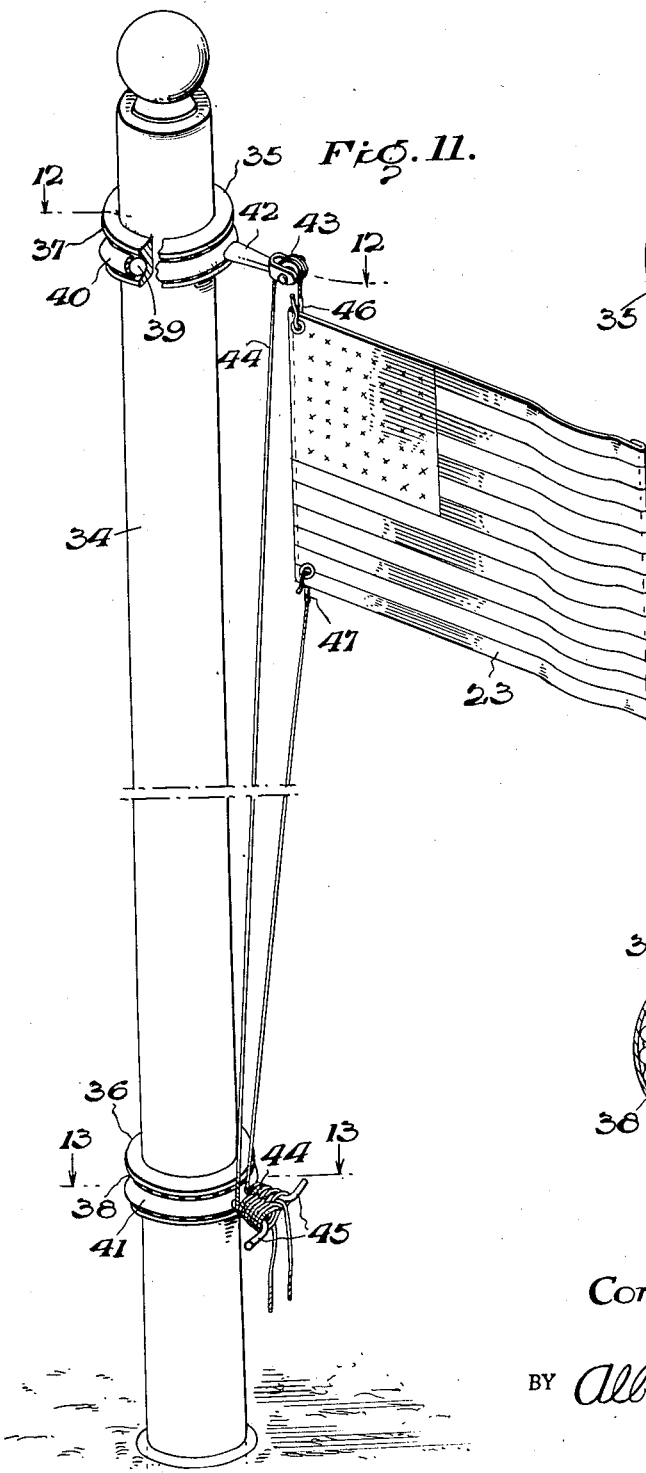
INVENTOR
Cora M. Andrews.
BY Albert J. Kramer
ATTORNEY

United States Patent Office 2,799,240
Patented July 16, 1957

2,799,240

FLAG MOUNTINGS

Cora M. Andrews, Arlington, Va.

Application December 30, 1954, Serial No. 478,562

1 Claim. (Cl. 116—174)

This invention relates to flag mountings and is more particularly concerned with means for mounting a flag, including banners and similar items of display, on a pole.

It frequently happens that a flag mounted on a pole becomes furled or wrapped around the pole, wholly or partially, and does not wave freely, thereby detracting from the appearance. One of the objects of this invention is the provision of means for mounting a flag on a pole so as to minimize such furling.

Another object of the invention is the provision of a flag mounting which is effective to permit the flag to swivel around the pole and hence to be presented as a fully unfurled flag, irrespective of the relative direction of motion of the air or the changes in direction thereof.

A further object of the invention is the provision of a flag mounting which is particularly adapted to portable flag poles or staffs, such as may be set in a floor or street socket, carried by persons in a parade or ceremony, or on a day of celebration, hung out of a window or from a balcony, or mounted on an automobile or other vehicle.

A still further object of the invention is the provision of a flag mounting which is particularly adapted to permanently mounted flag poles on which the flags are raised and lowered by a rope.

A still further object of the invention is the provision of such means which can be provided either as a permanent or as a temporary part of the flag pole.

These and other objects and advantages of the invention will appear more fully from the following description considered together with the accompanying drawing.

In the drawing:

Fig. 1 is an elevational view of an embodiment of the invention secured to the top part of a flag pole and connected to a flag.

Fig. 2 is a top plan view of the elements shown in Fig. 1.

Fig. 3 is an enlarged perspective view of one of the collar members and its corresponding swivel hook member.

Fig. 4 is a perspective view of the swivel hook member alone.

Fig. 5 is a modified form of the swivel hook.

Figs. 6, 7, 8, 9 and 10 are fragmentary views of flag poles showing modified forms of the embodiment.

Fig. 11 is an elevational perspective view of a second embodiment of the invention, partly broken away and partly in section, adapted for use on permanently mounted flag poles of the type on which the flag is raised and lowered by a rope.

Fig. 12 is a cross-sectional view along the line 12—12 of Fig. 11.

Fig. 13 is a cross-sectional view along the line 13—13 of Fig. 11.

Referring with more particularity to the drawing in which like numerals designate like parts, the embodiment illustrated in Figs. 1 to 4 comprise a pair of radially split ring or collar members 11 and 12 adapted to be placed around the top of a flag pole 13, one above the other, as shown in Fig. 1 and secured in position. These collars are preferably made of plastic, glass, metal, or some other material upon which a smooth or anti-friction surface can be developed. The collars are held in place against the flag pole by any suitable means. For example, they may be glued on or they may be provided with hook fasteners 14, or simply held in position by the resilience of the collars themselves contracted about and frictionally engaging the pole, with or without cleats 15 on the inside to sink into the body of the flag pole.

At the periphery of each of the rings 11 and 12, there is provided a recessed annular groove or race 16 into which a hook member 17 is swiveled. The hook member 17 may be of any suitable type. A suggested and preferred simple type is illustrated clearly in Fig. 4 and it comprises an open ring 18 of resilient wire, having a dependent portion 19 extending radially outwardly and an extension 20 thereof curved backward to form a U-shaped hook. The extension 20 is provided with a transverse V-shaped portion 21 projecting inwardly against or adjacent to the portion 19. Alternately, the portion 19, as shown in Fig. 5, may be provided with the U-shaped portion 21A. Thus, there is provided a very simple and efficient clip or hook for quickly attaching and detaching to the rings 18, grommets or eyelets 22 of a flag 23.

The open ring 18 extends for a distance greater than half the circumference of the annular groove 16 and is snapped in place thereon with a somewhat loose fit to permit it to slide around in the groove.

The flag 23 may contain two or more of the eyelets or grommets 22 and for each such eyelet or grommet, there would be provided a set comprising an annular collar 11 and a hook member 17.

Alternately, instead of providing the collar members 11, the flag pole itself may be provided with grooves 24, as shown in Fig. 6. The grooves 24 may, if desired, be provided with linings 25 of brass, copper, aluminum, plastic, etc., as shown in Fig. 7. Such linings may also be formed at the end of a tubular sleeve or guard 26 placed over the pole, as shown in Fig. 8.

Still another modification is shown in Fig. 9 wherein the grooves 27 are formed in a sleeve 28, the sleeve having a smooth inner surface and being held in proper position on the flag pole by means of nails or screws 29, or any other suitable means.

The embodiment shown in Fig. 10 is similar to that of Figs. 1 to 4, except that the split collars are made wider and provided with lips 30 and 31 at the top and bottom, respectively, for the reception of resilient clamping rings 32 and 33 to hold them in place.

The embodiment illustrated in Figs. 11 to 13 is similar to the first described embodiment, except that the pole 34 carries one of the collar members 35 at the top and another collar member 36 at the bottom within reach of a person who is to raise or lower the flag. These collar members are permanently secured to the pole. Also, the annular grooves 37 and 38 of the collars 34 and 35 comprise inner races for ball bearings 39 carried by outer races 40 and 41. The inner race 40 on the upper collar member 35 has an outwardly projecting arm 42 at the end of which there is mounted a rope pulley 43 for the hoisting rope 44 of the flag.

The outer ball bearing race 41 on the lower collar is provided with a rope anchor of any suitable type, such as a pair of oppositely directed prongs 45.

Roller bearings or any other type of anti-friction bearings may be used instead of the ball bearings illustrated.

The flag is connected to the ends of the rope by the usual rope hooks 46 and 47 and raised and lowered in the usual manner. When it is raised and the bottom of the rope is anchored to the rope anchor, there is provided complete freedom for both the flag and the rope to swivel together about the flag pole, thereby preventing or minimizing the likelihood of the flag becoming furled or wrapped about the pole. This embodiment of the invention also permits the display of more than one flag on a single flag pole, such as a United Nations display, by providing a plurality of radial or parallel arms, like the arm 42, on the race 40, each having a pulley, like the pulley 43. A corresponding number of hoisting ropes, like the rope 44, would also be provided together with sufficient rope anchor means for these ropes on the outer race 41, which may or may not be as many in number as the pulleys, because it might be possible to provide a single anchor for more than one rope.

Having thus described my invention, I claim:

In combination with a tapered flag pole, a pair of ball bearing devices, each of said devices comprising an outer race and an inner race, the inner race of each ball bearing device having an aperture therethrough of different diameter relative to the aperture through the inner race of the other ball bearing device, to independently encircle the flag pole at different elevations one from the other, both of said inner races being secured directly to the flag pole at points where the diameter of the flag pole corresponds to the inner diameters of the apertures, respectively, a flag rope pulley connected to and carried by the outer race of the uppermost ball bearing device, a rope anchor secured to the outer race of the lowermost ball bearing device, a flag rope between said pulley and anchor, and means for connecting a flag to said rope.

References Cited in the file of this patent
UNITED STATES PATENTS

| | | |
|---|---|---|
| 429,214 | Lanius | June 3, 1890 |
| 433,124 | Hall | July 29, 1890 |
| 756,989 | Suhr | Apr. 12, 1904 |
| 1,048,291 | Buckley | Dec. 24, 1912 |
| 1,476,426 | Short | Dec. 4, 1923 |
| 1,554,758 | Post | Sept. 22, 1925 |
| 1,575,040 | Crum | Mar. 2, 1926 |
| 1,855,824 | Crichton | Apr. 26, 1932 |
| 2,672,118 | Martin | Mar. 16, 1954 |